Patented Nov. 16, 1948

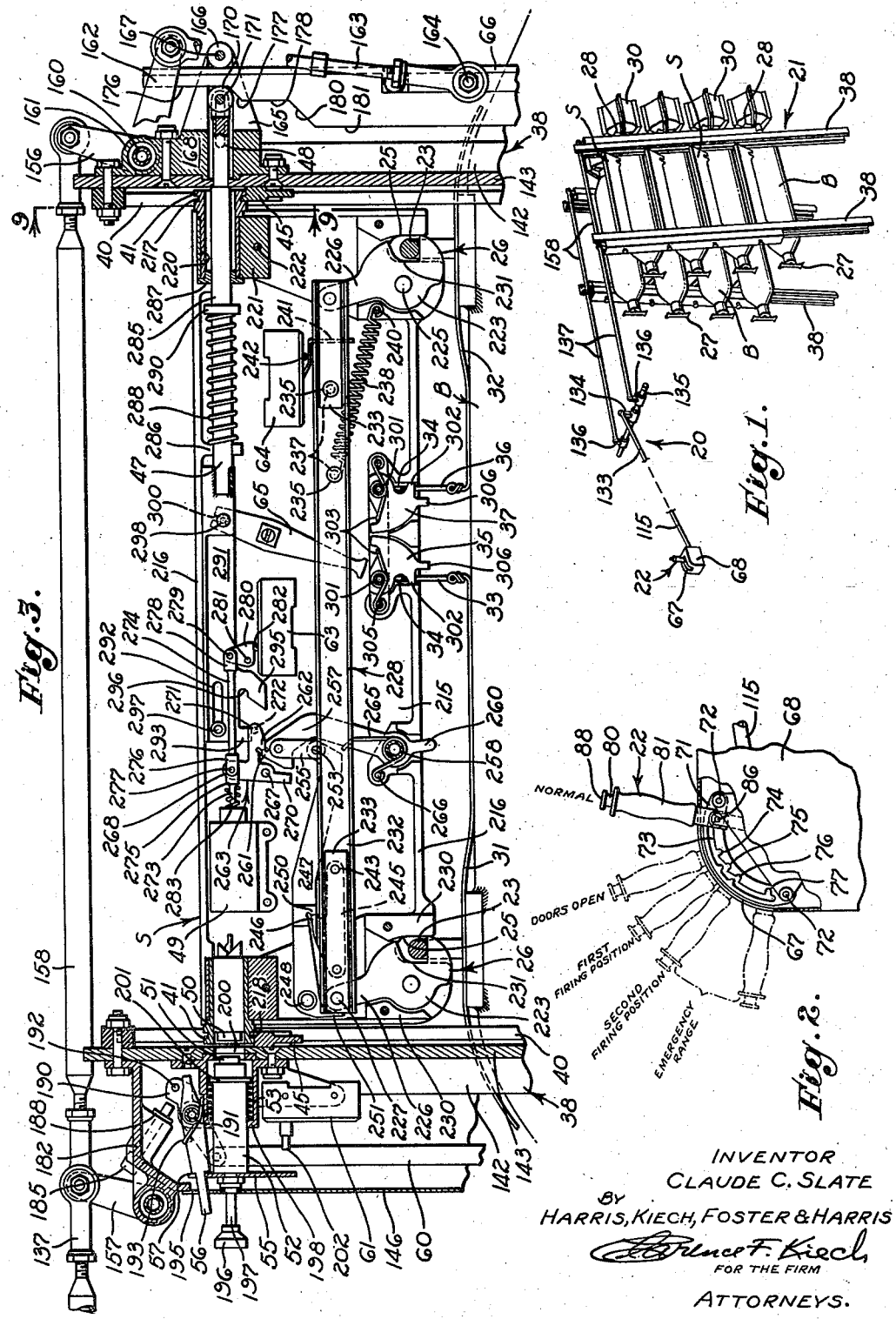

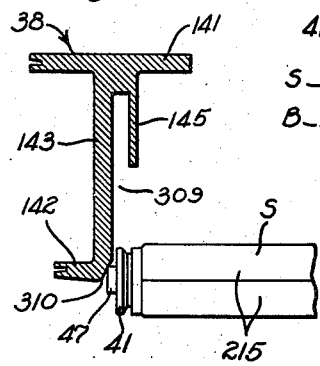
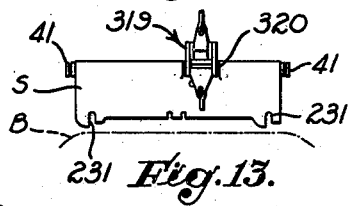
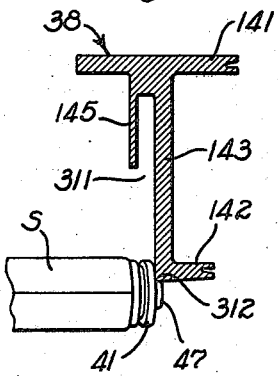
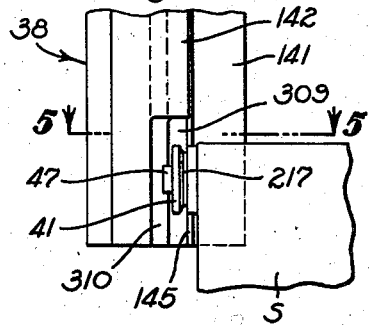
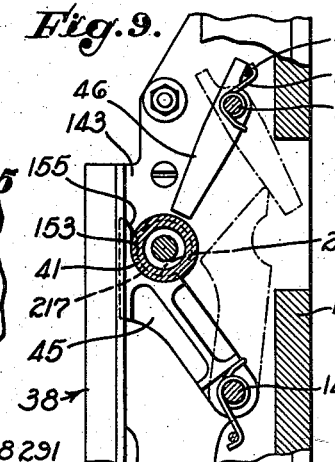
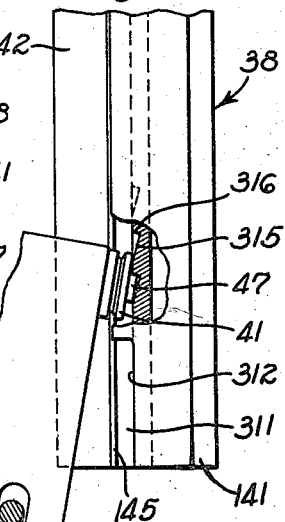
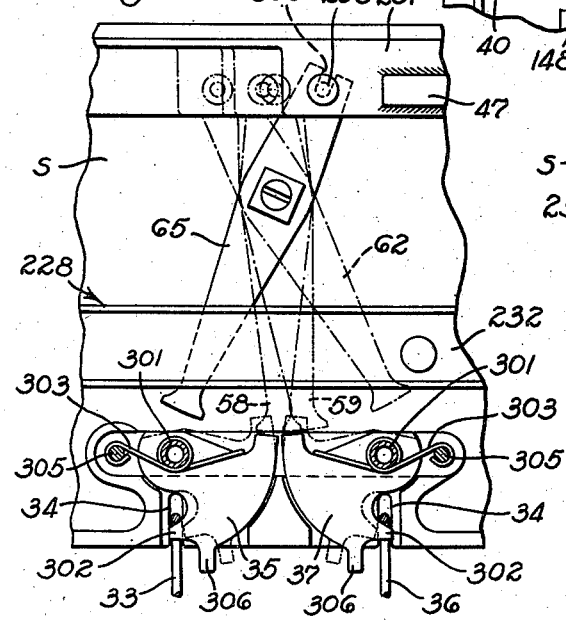

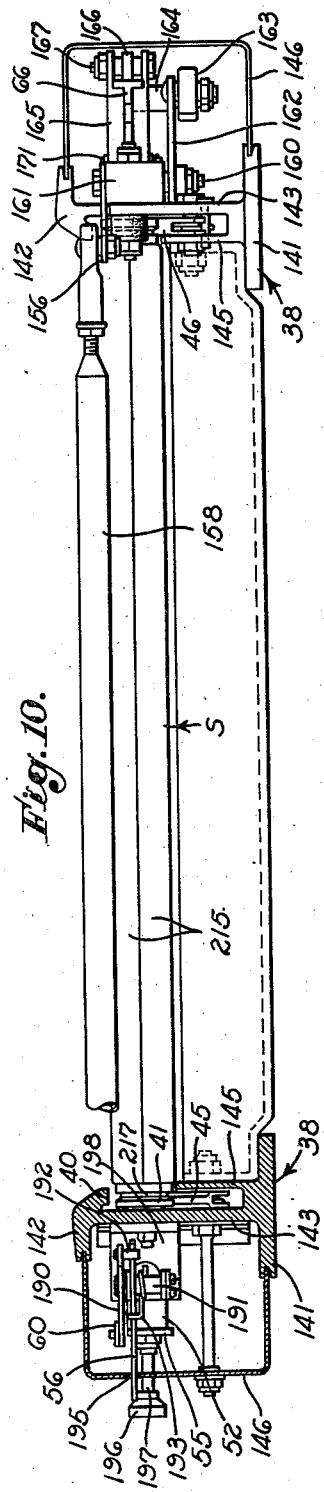
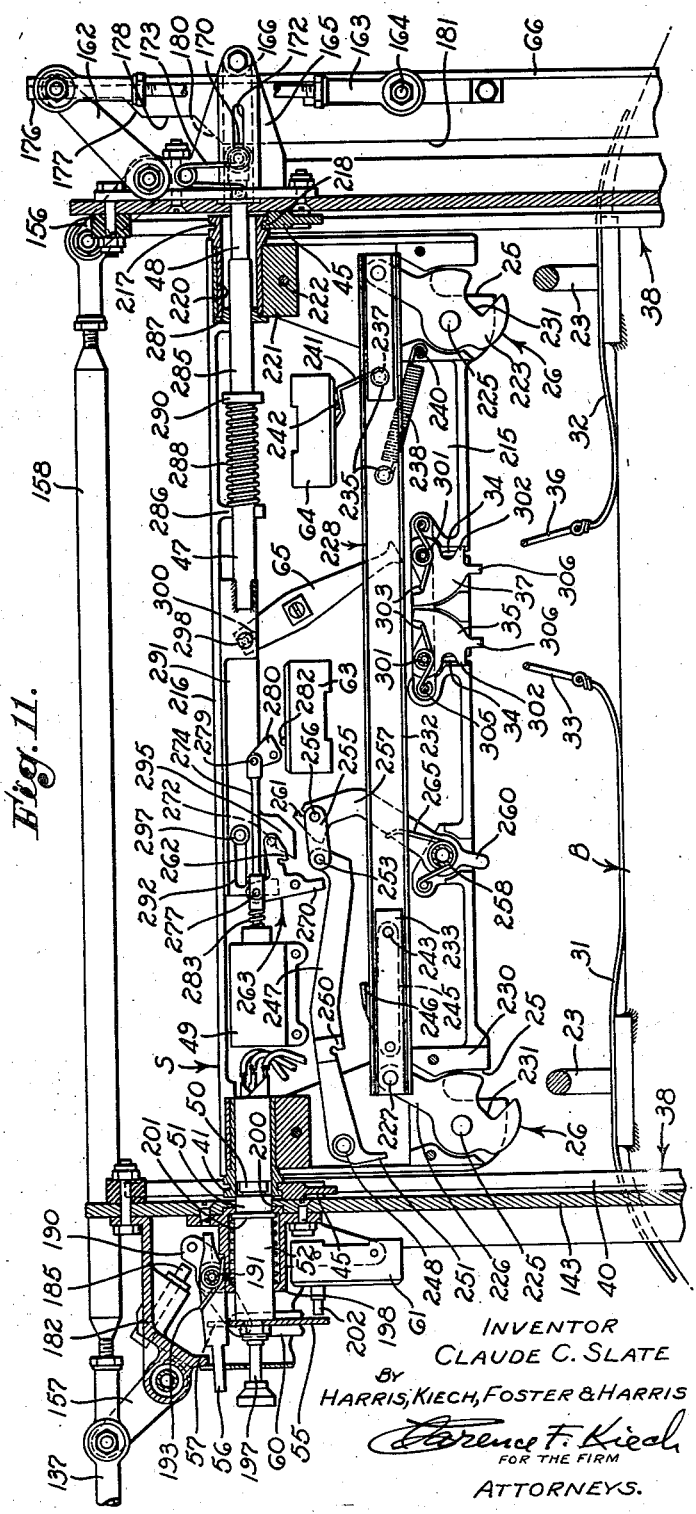
Fig. 10.
Fig. 11.
INVENTOR
CLAUDE C. SLATE
BY HARRIS, KIECH, FOSTER & HARRIS
Clarence F. Kiech
FOR THE FIRM
ATTORNEYS.

2,453,870

UNITED STATES PATENT OFFICE 2,453,870

BOMBING ARMAMENT FOR AIRCRAFT

Claude C. Slate, Burbank, Calif., assignor to Hughes Tool Company, Houston, Tex., a corporation of Delaware Application February 13, 1943, Serial No. 475,719

12 Claims. (Cl. 89—1.5)

The present invention is directed to an apparatus commonly known as a bomb rack together with associated mechanism employed in an aircraft for transporting and releasing aerial bombs. The general object of my invention is to improve upon the arrangement disclosed in my copending application, Serial No. 405,010, filed August 1, 1941, entitled "Bomb-carrying apparatus for aircraft."

In such an arrangement the mechanism for releasing bombs from the aircraft is not entirely incorporated in the structure of the bomb rack per se, but instead is largely contained in individual shackles, each shackle being adapted, on one hand, for releasable engagement with a bomb, and adapted, on the other hand, for releasable mounting on the bomb rack of the aircraft. In the loading procedure, a shackle separate and apart from the bomb rack is engaged with a bomb and then the bomb with the attached shackle is hoisted to a station on the bomb rack. As the bomb is hoisted into place, two trunnions on opposite ends of the attached shackle pass upwardly through complementary guide channels in rails or frame members of the bomb rack and each station on the bomb rack is provided with means to automatically engage the shackle trunnions for support of the bomb.

One object of the present invention, as will be explained later, is to facilitate entrance of the shackle trunnions into the guide channels of the bomb rack. Theretofore the task of introducing the trunnions into the guide channels has been somewhat awkward especially under conditions of poor lighting often met in wartime.

Another object of the present improvement is to preclude reversal of a shackle in the bomb rack. The mechanism in each shackle is controlled by complementary mechanism on the bomb rack, the necessary operative connection between the two complementary mechanisms being effected through the trunnions of the shackle. If the trunnions of a shackle are reversed with respect to the bomb rack, the necessary connections with the control mechanism are not accomplished and the bomb shackle remains inoperative. It is unnecessary to stress the extreme hazard of undertaking a bombing flight with any of the bomb shackles inoperative. One specific object of my invention is to provide mechanical obstacles to inadvertent reversal of bomb shackles and a feature of my invention is the concept of providing for the sake of safety two successively effective blocking means for each shackle to prevent such reversal.

A further object of the invention is to provide greater flexibility in bomb control with respect to arming of the released bomb. In the arrangement disclosed in my copending application, bombs may be dropped in two states only, namely, unarmed state to fall harmlessly, and armed or "live" state for detonation. In the present arrangement I propose to give the bombardier or pilot the choice of three states. The bomb may be released in unarmed state to fall harmlessly, or released in armed state for detonation on impact, or as a third choice may be released in armed state for delayed detonation.

Other objects and advantages of my invention will be apparent from the following description, taken with the accompanying drawings.

In the drawings, which are to be considered as illustrative only,

Fig. 1 is a diagrammatic view in perspective showing my bomb apparatus and associated mechanism as installed in an aircraft;

Fig. 2 is a view in side elevation partly broken away showing a control lever for the bomb-releasing mechanism;

Fig. 3 is a view partly in elevation and partly in section showing a shackle mounted on the bomb rack in engagement with a bomb, the shackle being electrically disconnected;

Fig. 4 is a fragmentary view in side elevation showing the trunnion of a properly positioned shackle being introduced into a guide channel of the bomb rack;

Fig. 5 is a sectional view taken as indicated by the line 5—5 of Fig. 4;

Fig. 6 is a view similar to Fig. 5 illustrating the first obstacle encountered when an attempt is made to install an inadvertently reversed shackle;

Fig. 7 is a fragmentary view partly broken away illustrating the second obstacle encountered when an attempt is made to mount an inadvertently reversed shackle;

Fig. 8 is an enlarged fragment of Fig. 3 showing various positions of an arming lever in the shackle mechanism;

Fig. 9 is a fragmentary section taken as indicated by the line 9—9 of Fig. 3;

Fig. 10 is a top view partly in section of a portion of the bomb rack;

Fig. 11 is a view similar to Fig. 3 illustrating the emergency release of a bomb in unarmed state;

Fig. 12 is a side elevation on a reduced scale of the shackle as designed for cooperation with a hoisting clamp; and Fig. 13 is a cross-sectional view of the shackle showing the configuration of a grip portion designed to be engaged by the clamp.

The general arrangement

Fig. 1 shows a forward control linkage generally designated 20 leading rearward to a frame or bomb rack generally designated 21 for installation in the bomb bay of an airplane (not shown) and shows eight bombs B held by individual shackles S at eight shackle stations on the bomb rack. The linkage 20 may be controlled either by a single lever or by two or more levers at various stations on the aircraft. Fig. 1 shows only one control lever 22.

In the arrangement described in my copending application, a lever for controlling the bomb rack mechanism is movable to four operative positions. In the present system the control lever 22 is movable to five positions, namely, a normal position at which the doors of the bomb bay are closed and all the bombs are locked against release, the arrangement being such that any bomb accidentally released will be released in unarmed state; a door-opening position at which the bomb-release mechanism is still locked; a first firing position at which the shackles are unlocked to permit operation for release of the bombs in response to a control circuit, the arrangement being such that the released bombs are armed for detonation on impact; a second firing position at which the shackle units are unlocked to permit operation for release of the bombs in response to the control circuit, the arrangement being such that the released bombs are armed for delayed detonation; and an emergency position toward which the lever may be shifted while the doors of the bomb bay are still open to release the bombs consecutively by mechanical action, the arrangement being such that the bombs are released in unarmed state to fall harmlessly.

As indicated in Figs. 1, 3, and 11, each of the bombs B has a pair of spaced metal support loops 23 adapted to enter slots 25 in the lower edge of a shackle S for engagement therein by suitable bomb-engagement means generally designated 26. The bomb has a forward air wheel or spinner 27 and a rearward spinner 28 similar in construction to rotary propellers, the rearward spinner being inside a tail assembly 30. Each bomb is provided with two separate arming means in the form of a first wire 31 normally having its outer end positioned to block rotation of the forward spinner 27 and a second wire 32 normally having its outer end positioned to block rotation of the rearward spinner 28. The forward wire 31 ends in a loop or arming ring 33 adapted to extend into a slot 34 in the shackle to be engaged therein by an arming member 35, and the rearward wire 32 likewise is provided with a loop or arming ring 36 adapted to extend into a second slot 34 for engagement therein by a second arming member 37.

Whether or not a bomb released by a shackle is armed depends upon whether or not the arming members 35 and 37 retain one or both of the arming rings 33 and 36, thereby separating one or both of the wires 31 and 32 from the bomb to permit one or both of the spinners 27 and 28 to rotate as the bomb drops through the air. It is contemplated that in the first firing position of the control lever 22, both of the arming loops will be retained by the bomb shackle to make both the forward and the rearward fuses of the bomb effective, so that the bomb will detonate on impact, or failing to do so will later detonate by delayed action of rearward fuse. It is further contemplated that when a bomb is released with the control lever 22 in the second firing position, only the rearward arming ring 36 will be retained by the shackle so that only the rearward fuse of the bomb will become effective, the bomb being detonated only by delayed action.

The frame 21 in the bomb bay of the aircraft includes on each side a pair of parallel frame members or rails 38 adapted to serve as tracks for the shackles. For example, each of the rails 38 may provide a longitudinal guide channel 40 shown in section in Fig. 10 and each shackle S may have a pair of projections in the form of tubular trunnions 41 dimensioned to slide in the channels 40. Preparatory to loading a bomb, a shackle separated from the bomb rack 21 is moved aggressively against the bomb to cause the bomb loops 23 to aggressively enter the slots 25 and thereby cause the engagement means 26 in the shackle to automatically engage the bomb.

Any suitable hoist means may be engaged either with the bomb or with the shackle. At each shackle station along each guide channel 40 is mounted suitable means for engaging the shackle, which means, as best shown in Fig. 9, may comprise the combination of a pivoted support arm 45 and a pivoted locking arm 46. The arrangement is such that both arms 45 and 46 at a shackle station automatically retract to permit upward movement of a shackle trunnion through the shackle station, but become effective automatically to engage and lock a shackle trunnion when the trunnion is moved downward into the shackle station. In the loading procedure each shackle in turn is guided up the pair of channels to a level above a desired shackle station and then lowered into final locked position at the station.

Each shackle, as shown in Fig. 3, houses mechanical means including a slide rod generally designated 47 that is automatically responsive to the previously mentioned control linkage 20 for the release of bombs. The slide rod 47 extends into one of the two trunnions 41 and when the shackle is properly mounted on the frame 21 at a shackle station, the end of the slide rod 47 is opposite an operating member in the form of a plunger 48 on the frame 21, the operating plunger 48 being operatively connected to the control linkage 20.

Each shackle also houses electrically-actuated means including a solenoid 49 that may be energized by a control circuit to release bombs. For electrically connecting the shackle to the control circuit in the airplane, two complementary fittings are provided, one fitting 50 fixedly mounted in the other of the two shackle trunnions 41 and a second fitting 51 mounted on a plunger 52 at the shackle station. The plunger 52 is surrounded by a suitable spring 53 that urges the plunger toward the shackle trunnion. The plunger 52 carries a transverse bar 55 adapted for engagement by a pivoted latch lever 56 to hold the fitting or electrical connecting means 51 in cocked and ineffective position as shown in Fig. 3. The bar 55 has a slot 57 in its upper end through which the latch lever 56 extends, the latch lever being adapted to releasably engage the lower edge of the slot.

When the electrical connecting means or fitting 51 is released from its ineffective cocked position, the spring 53 causes longitudinal movement of the plunger. If at such time a shackle is mounted at the shackle station, the released electrical connecting means 51 stops at an effective position shown in Fig. 11 in engagement with the fitting 50, thereby connecting the solenoid 49 with the control circuit on the aircraft. In the absence of a shackle at the shackle station, the released plunger continues to move inwardly to a third or blocking position (not shown), at which blocking position the electrical connecting means 51 extends into the channel 40 to bar any passage of a shackle trunnion upward through the shackle station. It is apparent that this arrangement forces a member of the loading crew to cock an electrical connecting means 51 prior to any movement of a shackle into or through the corresponding shackle station, and if all of the shackle stations are utilized in a loading procedure, all of the electrical connecting means 51 are necessarily cocked in the course of the procedure. Since the upper shackle stations are loaded first and since each upper bomb must pass through all of the stations below, all of the electrical connecting means 51 are cocked as soon as the two uppermost bombs on opposite sides of the frame are mounted for flight.

On each side of the frame 21 is a release rod 60 interlocked with the control linkage 20 to release automatically all of the cocked electrical connecting means 51 whenever the doors of the bomb bay of the aircraft are closed at the end of a loading procedure. The human element, then, does not enter into the question of whether or not all shackles in the bomb bay are electrically connected to the control circuit.

Whenever an electrical connecting means 51 is released in the absence of a shackle at a shackle station, the resultant movement of the electrical connecting means to the third or blocking position causes the transverse bar 55 to press against and operate a skip switch 61, the skip switch being moved from a first position to a second position to cause the control circuit to be connected to the next shackle station in the predetermined sequence of stations. Inside each shackle is a second skip switch 63 that is moved from a first position to a second position whenever the solenoid 49 is deenergized and at the same time the bomb-engagement means 26 of the shackle is in released position, the second skip switch likewise causing the control circuit to be connected to the next shackle station in the sequence. In other words, when a bomb is installed at a shackle station, the second skip switch 63 in the shackle is made effective to switch the control circuit to the next station when the solenoid in the shackle is energized to release the bomb and then is deenergized after the bomb is released. It is apparent that the inclusion of skip switches 61 and 63 in the control circuit causes the control circuit to be adjusted automatically to the number and distribution of bombs in the bomb bay when the airplane takes off. Whatever shackle stations are loaded with bombs are made automatically responsive to the control circuit in sequence. An indicator or signal switch 64 in each shackle controls a corresponding indicator light (not shown) to indicate to the bombardier that the shackle station is loaded, the switch being responsive to the bomb-engagement means 26.

The two arming members 35 and 37 normally only yieldingly engage the corresponding arming rings 33 and 36 respectively, so that the two arming rings may easily escape if the bomb is released. The slide rod 47 controls an arming lever 65 and is movable to four positions. Whenever the control linkage 20 is in either its first or second position, i. e., in its normal position or its door-opening position, the slide rod 47 approximates the normal position shown in Fig. 3; and at such time the slide rod blocks either electrical or accidental release by the bomb-engagement means 26 and also holds the arming lever 65 at an ineffective position with respect to both the arming members 35 and 37. This particular ineffective position of the arming lever 65 is shown in Fig. 3 and is shown in solid lines in Fig. 8. If a bomb were to be released under these conditions by structural failure, the two arming rings 33 and 36 on the bomb would readily escape from the shackle and the released bomb would not be armed for detonation.

In the first firing position of the slide rod 47, the dotted position 58 in Fig. 8 corresponding to the first firing position of the previously mentioned control lever 22, the bomb-engagement means 26 is free to release a bomb in response to energization of the control circuit on the airplane. At such time the arming lever 65 blocks release movement of both the arming members 35 and 37 so that both the arming rings 33 and 36 of the bomb are retained in a positive manner when the bomb is released. The retention of the arming ring 33 releases the forward spinner 27 for rotation to arm the bomb for detonation on impact, and in like manner the retention of the arming ring 36 causes the bomb to be armed for delayed detonation in the event that the bomb fails to explode on impact. In the second firing position of the arming lever 65, the dotted line position 59 of Fig. 8 corresponding to the second firing position of the control lever 22, the arming member 35 is free to release the forward arming ring 33, but the arming member 37 is caused to retain the rear arming ring 36, thereby to cause the released bomb to be armed for delayed detonation only.

In movement of the slide rod 47 to the extreme or emergency position shown in Fig. 11 corresponding to the extreme emergency position of the control lever 22, the slide rod causes the bomb-engagement means 26 to release the bomb in an emergency when explosion of the released bomb is not desired. It will be noted in Fig. 11 and in the dotted position 62 in Fig. 8 that the arming lever 65 is at this time swung clear of both arming members 35 and 37, thereby to permit both arming members to release both arming rings 33 and 36.

The various operating plungers 48 that control the various slide rods 47 in the shackles are in turn controlled by a cam bar 66 that causes the bombs to be dropped successively in the predetermined sequence as the control linkage 20 progresses beyond the second firing position of the control linkage to the final emergency position.

The forward control linkage

The previously mentioned control lever 22 extends through a slot 67 in a small housing 68 shown in Figs. 1 and 2. Associated with the lever 22 is a curved rack 71 in the housing 68, the curved rack being mounted on a pair of spaced bolts 72 and being formed with a curved slot 73 having various recesses corresponding to various positions of the lever. One recess (not shown) is engaged by the lever 22 in the position of the lever shown in solid lines in Fig. 2, which position corresponds to the normal position of the control linkage 20 with the doors of the bomb bay closed. A second recess indicated at 74 in Fig. 2 corresponds to the position of the control linkage 20 at which the doors of the bomb bay are opened, the various shackles being locked against electrical release of bombs at this lever position. When the lever is moved from engagement with the recess 74 to a recess 75 corresponding to the first firing position of the control linkage 20, the shackle mechanisms are unlocked to permit release of the bombs in response to energization of the control circuit. When the lever 22 is advanced from the recess 75 to the next recess 76 corresponding to the second firing position of the control linkage, the various mechanisms in the shackles remain responsive to the control circuit. When the lever 22 is advanced beyond the recess 76 toward a final recess 77, it passes through a range of positions in which the various shackles are mechanically operated in succession to release the bombs.

The control lever 22 comprises two parts adapted for relative longitudinal movement, the two parts being an inner tubular member 80 and an outer tubular member 81. The inner tubular member is mounted for simple pivotal movement about a fixed axis and the outer tubular member 81 is mounted on the inner tubular member in a sliding manner for longitudinal movement, the outer tubular member carrying a transverse locking pin 86 for cooperation with the curved rack 71. Suitable yielding means (not shown) continuously urges the outer tubular member 81 toward the pivotal axis of the lever so that normally the locking pin 86 is urged toward engagement with one of the previously mentioned recesses of the curved rack 71. Normally, the locking pin 86 is in one of the rack recesses and at such time the outer tubular member 81 is slightly retracted from the outer end of the inner tubular member. To shift the lever from one position to another, the bombardier or pilot grasps the handle portion of the outer tubular member 81 for longitudinal movement of the outer tubular member to unseat the locking pin 86, and to facilitate such longitudinal movement may place his thumb on the protruding end portion 88 of the inner tubular member 80.

In the particular arrangement shown in Fig. 1, the control lever 22 is operatively connected to an operating rod 115 of the control linkage 20. Other parts of the control linkage shown in Fig. 1 include an operating rod 133 that is connected to a rocker arm 134 on an upper rocker shaft 135. The upper rocker shaft carries two additional rocker arms 136 from which a corresponding pair of operating rods 137 extends over opposite sides of the bomb rack 21 in the bomb bay of the aircraft.

Mechanism on the bomb rack

As shown in Fig. 10, each of the rails 38 in the frame 21 of the preferred form of the invention is an extruded beam having an outer side wall 141, an inner side wall 142, an interconnecting web 143 and a secondary web 145 spaced from the interconnecting web, the secondary web defining with the inner side wall 142 the previously mentioned channel 40. A sheet metal housing 146 is connected at its longitudinal edges to the side walls of each rail 38 to cooperate with the rail in enclosing various movable parts that are mounted on the rails.

As best shown in Fig. 9 the previously mentioned support arm 45 at each of the shackle stations on a rail 38 is mounted on a pivot 147 between the two webs of the rail, the pivot being to one side of the rail channel 40 to permit the support arm to swing clear of the channel. A suitable spring 148 continuously urges the support arm 45 into the effective position shown in full lines in Fig. 9. The locking arm 46 that is associated with the support arm 45 at each shackle station is mounted on a pivot 150 that is likewise located to one side of the rail channel to permit the locking member to swing clear of the channel. Normally the locking arm 46 is in the effective position shown in full lines in Fig. 9, the locking arm being urged clockwise by a spring 151 against a stop pin 152. When a trunnion 41 of a shackle is in normal position at the shackle station, it rests in a curved seat 153 formed in the support arm 45 and at such time the associated locking arm 46 overhangs the trunnion to prevent accidental dislodgment of the trunnion. If a shackle station is not occupied, the trunnion of a shackle moving upward into the shackle station will force the support arm to the dotted position of Fig. 9, and the toe 155 of the support arm will strike the locking arm 46 and force the locking arm clear as indicated in Fig. 9. After the trunnion of the shackle is moved high enough to permit the support arm to swing back to normal position, the trunnion may be lowered into the seat 153 whereupon the locking arm returns automatically to its effective position. The locking arm 46 at one end of a mounted shackle may be manually swung out of the way to free one of the shackle trunnions which may then be raised to tilt the shackle out of engagement with the two rails without the necessity of moving the shackle down the rails to the entrance ends of the rail channels.

Each of the rearmost operating rods 137 of the control linkage 20 is operatively associated with one of the pairs of rails 38 on a side of the bomb bay. As shown in Figs. 3 and 11, each of the operating rods 137 controls a rearward rocker arm 156 and a forward rocker arm 157 at the top of the pair of side rails 38, the two arms being interconnected by a rod 158. The rearward rocker arm 156 is mounted on one end of a shaft 160 in a bearing 161, and the other end of the shaft carries a rocker arm 162 that actuates the previously mentioned cam bar 66 through the medium of a suitable link 163, the link being connected to a stud 164 (Fig. 10) on the cam bar.

The cam bar 66, which is T-shaped in cross section, slidingly extends through brackets 165 that are mounted on the rear rail at each of the shackle stations. Each of the brackets carries a roller 166 (Fig. 3) on a fixed pivot 167 for rotary contact with the rear of the cam bar. The previously mentioned operating plunger 48 at each of the shackle stations for actuating a slide rod 47 in a shackle is slidingly mounted in a block 168 at the base of the corresponding cam bracket 165, and carries at its outer end a roller 170, the roller being mounted on a suitable pin 171 that slidingly extends through guide slots 172 in the arms of the bracket. Suitable means such as a spring 173 (Fig. 11) is provided to continuously urge each of the operating plungers 48 outward against the cam bar 66.

In the region of each shackle station the forward or cam edge of the cam bar 66 forms a dwell 176 that corresponds to the movement of the control linkage 20 between the normal position of the control linkage with the bomb bay doors closed and the position of the control linkage at the end of the opening movements of the doors. Throughout this range of movement on the part of the control linkage no mechanical forces are transmitted to the shackles by the various operating plungers 48. The dwells 176 are of uniform position and dimension at the various shackle stations and each leads to a rise 177 on the cam bar that causes the operating plunger 48 to move inward sufficiently to cause the slide rod 47 in the associated shackle to move from its normal position shown in Fig. 3 to a firing position shown in Fig. 11. All of the various slide rods 47 in the shackles are moved simultaneously in this manner whenever the control linkage 20 is moved beyond the door opening position of the control linkage represented by the recess 74 in Fig. 2 to the first firing position of the control linkage represented by the recess 75 in Fig. 2.

Adjacent the rise 177 the cam bar 66 has at each shackle station a dwell 178 that represents movement of the control linkage into the range of emergency positions of the control linkage. The dwells 178 at the various shackle stations vary in length and each terminates in a final rise 180 that causes the associated operating plunger 48 to move the slide rod 47 of the corresponding shackle from the firing position of the slide rod shown in Fig. 3 to the third or emergency position of the slide rod shown in Fig. 11. Each final rise 180 is followed by a final dwell 181. Since there is a cam bar 66 on each side of the bomb bay and since it is required that the bombs be released in an alternate manner with respect to the two sides of the bomb bay, the sequence being upward, the rise portions 180 on the two cam bars are arranged in staggered relation to carry out the predetermined sequence.

The forward rocker arm 157 is carried by a bracket 182 on a forward rail 38. The bracket 182 is bored to slidingly guide an inclined plunger 185. The plunger 185 is in the path of the rocker arm 157 and is continuously urged toward the rocker arm by a concealed spring, the upward movement of the plunger being limited by a flange 188 on the lower protruding end of the plunger. Normally the inclined plunger 185 is in the position shown in Fig. 3, and the rocker arm 157 does not affect the inclined plunger unless the control linkage 20 is moved into its door-closing position. Whenever the bombardier or pilot operates the control linkage 20 to close the bomb bay doors, the rocker arm 157 swings against the protruding head of the inclined plunger 185 and thereby shifts the plunger longitudinally downward against a lever 190 at the uppermost shackle station. The lever 190 is mounted on a pivot 191 adjacent the previously mentioned latch lever 56 on the same pivot. When the inclined plunger 185 rocks the lever 190, a laterally extending pin 192 on the lever 190 moves against an arm of the latch lever 56 to trip the latch lever and thereby releases the corresponding plunger 52 carrying the corresponding electrical fitting 51.

The outer arm of the lever 190 is pivotally connected to the previously mentioned release rod 60 that extends downwardly to the various shackle stations below. As shown in Fig. 3 the release rod 60 is connected at each shackle station to a lever 190 which is adapted to trip the associated latch lever 56 at the shackle station. Each latch lever 56 is urged toward its latching position by a suitable spring 193. It will be noted that the described arrangement permits each of the latch levers 56 to be tripped independently of movement on the part of the associated lever 190, and it will be further noted that each latch lever 56 extends through a slot 195 in the sheet metal housing 146 so that the latch levers may be individually tripped manually when desired.

Each of the plungers 52 that carries the electrical fitting 51 at a shackle station is of hollow construction and has an external handle 196 on a stem 197 that extends through the sheet metal housing 146. Each of the plungers 52 is slidingly mounted in a cylindrical body 198 on the rail 38. The previously mentioned spring 53 that urges the plunger inwardly is enclosed in the cylindrical body 198. The electrical fitting 51 that is carried by the plunger extends through a circular aperture 200 in the rail 38 and is provided with a radial flange 201 that serves two purposes, first, to receive pressure from the previously mentioned spring 53 for urging the plunger inwardly, and, second, to abut the rail around the aperture 200 to limit the inward movement of the plunger at the previously mentioned third position of the plunger. When the plunger is in its third position, the portion of the transverse bar 55 extending downwardly from the plunger depresses an operating plunger 202 of the previously mentioned skip switch 61. The switch 61, which is of a type known to the art as a "micro" switch is normally in its first position and is moved to its second position whenever the operating plunger 202 is moved inward.

For the purpose of electrically connecting the electrical elements of the shackle units with the control circuit of the system, the fitting 51 encloses three insulated contacts (not shown) in concentric disposition to cooperate with three complementary insulated contacts (not shown) in the complementary fitting 50, the two fittings being designed to engage in telescoping relation.

*Detailed construction of a shackle*

Each of the shackles S includes two separable complementary casing sections 215 to form a suitable housing for the shackle mechanism, the two casing sections being rectangular in general configuration and having matched marginal flanges 216 to serve as top, bottom, and end walls. Each of the previously mentioned trunnions 41 is a cylindrical member with a peripheral groove 217 for engagement by a complementary curved lip 218 on one of the previously mentioned support arms 45 on the frame 21. Each of the tubular trunnion members is mounted in a bore 220 provided by a block 221, the block 221 being in turn mounted on one of the casing sections 215 by a suitable screw 222.

The previously mentioned bomb-engagement means 26 incorporated in each of the shackle units include two rotary hooks 223 associated with each of the engagement slots 25 of the shackle units. The two rotary hooks 223 are mounted on pivots 225 and have operating arms 226 that are connected by suitable pins 227 to the opposite ends of a longitudinal member generally designated 228, the longitudinal member serving to interconnect the two rotary hooks for movement in unison. Adjacent each of the engagement slots 25 the shackle unit is reinforced by a pair of complementary blocks 230, the blocks being on opposite faces of the rotary hooks 223 and being cut away to provide working clearance for the rotary hooks. Each of the rotary hooks 223 has an engagement recess or mouth 231 which is open, i. e., in registration with the shackle slots 25 when the engagement mechanism is in released position as shown in Fig. 11. When the engagement mechanism is in its engagement position to support a bomb, the rotary hooks are turned to the position shown in Fig. 3.

The longitudinal member 228 interconnecting the two rotary hooks 223 may comprise a pair of spaced parallel straps 232 reinforced at each end by shorter straps 233. At one end the two straps 232 are interconnected by rivets 235, each of which is surrounded by a suitable spacer sleeve 237. A suitable coiled spring 238 acting in tension between one of the rivets 235 and a fixed stud 240 continuously urges the longitudinal member 228 to the right as viewed in the drawings, thereby continuously urging the engagement mechanism toward its release position.

The previously mentioned indicator switch 64 is provided with a flexible arm 241 that lies in the path of movement of one of the rivets 235. When the engagement mechanism is in its engagement position as shown in Fig. 3, the rivet 235 is spaced away from the flexible arm 241 and the indicator switch 64 is in its first position. In the release position of the engagement mechanism the rivet presses against the flexible arm 241 as shown in Fig. 11 and thereby depresses a small plunger 242 to hold the indicator switch 64 in its second position.

At the other end of the longitudinal member 228 the two straps 232 are interconnected by a pair of rivets 243 that extend through a spacer block 245 and the spacer block is formed with an upwardly extending engagement shoulder 246. Above the longitudinal member 228 is a first or primary sear 247 mounted on a pivot 248, the sear having an engagement shoulder 250 to cooperate with the engagement shoulder 246 and having a downwardly extending toe 251. If the longitudinal member 228 is moved from its release position through its engagement position to a third limit position (not shown in the drawings), the longitudinal member or some element movable therewith strikes the toe 251 to rotate the sear 247 into the cocked position of the sear shown in Fig. 3 to block the return movement of the longitudinal member at the engagement position shown in Fig. 3. In my preferred construction, the toe 251 extends between the planes defined by the two straps 232 and is acted upon by the curved end of the operating arm 226 that extends upward from one of the rotary hooks 223.

Mounted in the swinging end of the first sear 247 is a pin 253 that is connected by a pair of parallel links 255 with a second pin 256 in the end of an angular cocking lever 257. The cocking lever 257 which is mounted on a pivot 258 is formed with a small finger 260 that extends downward to the exterior of the shackle for manual manipulation. At the cocked position of the cocking lever shown in Fig. 3 an engagement shoulder 261 on the cocking lever is abutted by a complementary engagement shoulder 262 of a second sear generally designated 263. Preferably a suitable spring 265 wrapped around the pivot 258 and anchored to a stud 266 continuously urges the cocking lever 257 toward its release position shown in Fig. 11.

The described arrangement makes it possible to use either one of two procedures to move the bomb-engagement mechanism from the release position shown in Fig. 11 to the engagement position shown in Fig. 3. In one procedure, the shackle, which has been taken from the bomb bay frame 21, is moved vigorously into engagement with the support loops 23 of a bomb. The support loops enter the engagement recesses 231 of the rotary hooks 223 and vigorously force the rotary hooks counter-clockwise. The leftward movement of the longitudinal member 228 past the engagement position of the longitudinal member acting on the toe 251 rotates the first sear 247 into cocked position. In the other procedure the shackle is pressed against the support loops 23 of the bomb less vigorously to force the longitudinal member 228 to its engagement position without acting on the toe 251, and while the longitudinal member is in the engagement position the operator manipulates the finger 260 to rotate the cocking lever 257 counter-clockwise against the opposition of the spring 265, the counter-clockwise movement of the cocking lever being translated into clockwise rotation of the first sear 247 through the medium of the interconnecting links 255.

As best shown in Fig. 3 the second sear 263, which is mounted on a pivot 267, has an operating arm 268, a kick arm 270, and an engagement arm 271. The engagement arm 271 of the second sear in addition to forming the previously mentioned engagement shoulder 262 carries a lateral pin 272. The previously mentioned solenoid 49 in the shackle has a movable core (not shown) from which extends a plunger 273 to actuate an operating rod 274. The solenoid plunger 273 is formed with a clevis 275 to enter a clevis 276 on the inner end of the operating rod 274 and connection between the plunger and operating rod is effected by a cross pin 277. The cross pin 277 not only extends through the plunger and operating rod but also through the operating arm 268 of the second sear 263. The outer end of the operating rod 274 is formed as a clevis 278 that is connected by a pin 279 to a bell-crank 280. The bell-crank is in the form of a triangular plate mounted on a pivot 281 and is positioned to rotate against an operating plunger 282 for controlling the skip switch 63.

Yielding means to urge the second sear 263 clockwise into engagement with the cocking lever 257 may be in the form of a suitable helical spring 283 embracing the solenoid plunger 273 between the solenoid 49 and the clevis 275. Counter-clockwise rotation of the second sear 263 from the engagement position shown in Fig. 3 not only results in release of the cocking lever 257, but also hastens the release movement of the engagement mechanism in a positive manner since the kick arm 270 of the second sear swings against the cocking lever. Since the cocking lever 257 is connected with the first sear 247 through the pair of links 255, the cocking lever throws the first sear upward in response to the blow from the kick arm 270. The cocking lever 257, the pair of links 255 and the first sear 247 in effect constitute a toggle linkage designed to favor rapid operation. The combined effect of the kick arm 270 and the cocking lever spring 265 is to minimize inertia lag and to cause extremely rapid releasing action in response to energization of the solenoid 49. Rapidity of the releasing action is further favored by the fact that the engagement shoulder 246 on the longitudinal member 228 and the complementary engagement shoulder 250 on the first sear 247 have inlined contact faces, the inclination being in a direction to favor the release action. By virtue of the particular design of the rotary hooks 223 shown in the drawings, the weight of the engaged bomb creates a releasing moment on the engagement mechanism of exceptionally high magnitude, favor exceedingly rapid releasing action on the part of the two rotary hooks as soon as the longitudinal member 228 is released by the first sear 247.

The operating rod 274 connected with the solenoid 49 has three positions, namely, a retracted position when the solenoid is energized, an intermediate position when the solenoid is deenergized while the second sear 263 is cocked, and a third or limit position to which it is urged by the spring 283 when the solenoid is deenergized while the second sear is uncocked. Whenever a bomb is released by the shackle, the spring 283 on the solenoid plunger automatically moves the operating rod 274 to its third position and thereby forces the bell-crank 280 against the operating plunger 282 to move the skip switch 63 to open position.

The previously mentioned slide rod 47 in the shackle has a cylindrical portion 285 that is guided by a bearing 286 and by a bushing 287 in the associated trunnion 41. Embracing the cylindrical portion 285 is a suitable spring 288 that acts between the bearing 286 and a radial flange 290 to urge the slide rod outward. Unitary with the cylindrical portion 285 of the slide rod is a blade portion 291 that is formed with a longitudinal slot 292, a locking shoulder 293, and an inclined cam shoulder 295 at the opening to a recess 296. The longitudinal slot 292 surrounds a fixed stop pin 297 that limits the outward movement of the slide rod at a limit position, at which limit position the outer end of the slide rod protrudes slightly from the outer end of the associated trunnion 41, as indicated in Figs. 4, 5, and 7.

The slide rod 47 is in its first position shown in Fig. 3 whenever the control linkage 20 is in either the normal closed-door position or in the open-door position represented by the recess 74 in Fig. 2. At such time the locking shoulder 293 of the blade portion of the slide rod is in the path of movement of the lateral pin 272 and consequently prevents rotation of the second sear 263 by accidental energization of the solenoid 49. When the control lever 22 is shifted outward from the recess 74 to the recess 75 representing the first firing position of the control linkage 20, the plunger 48 at the shackle station moves the slide rod inwardly to a position at which the recess 296 in the blade portion of the slide rod is opposite the lateral pin 272 and at such time the recess 296 provides clearance for counter-clockwise rotation of the second sear 263 in response to energization of the solenoid. When the control lever 22 is shifted from the recess 74 to the recess 75, the blade portion of the slide rod is still opposite the lateral pin 272 and the recess 296 still provides clearance for counter-clockwise rotation of the second sear 263 in response to energization of the solenoid. When the control lever 22 is shifted from the recess 76 to the final recess 77, each of the slide rods 47 in the various shackles in its turn is shifted sufficiently to cause the inclined cam shoulder 295 of the slide rod to engage and lift the lateral pin 272, thereby to rotate the second sear 263 out of engagement with the cocking lever 257, whereupon the previously described releasing action of the shackle mechanism is carried out automatically with extreme rapidity.

For operation of the arming lever 65, the blade portion of the slide rod 47 is provided with a stud 298 that engages a suitable slot 300 on the end of the arming lever. Each of the previously mentioned arming members 35 and 37 below the arming lever 65 may be in the form of a small plate mounted on a pivot 301, the plate having an engagement finger 302. A suitable spring 303 wound around the pivot 301 and anchored to a stud 305 yieldingly urges each of the arming members 35 and 37 to a normal position at which the engagement finger 302 extends across the corresponding arming slot 34 as shown in Fig. 8. A portion 306 of each arming member normally protrudes downwardly from the shackle for manual manipulation by the loading crew whenever it is desirable to retract the engagement finger 302 to admit an arming ring 33 or 36 of a bomb. It will be noted that in the normal position of an arming member 35 or 37, the engagement finger 302 presents an inclined surface in contact with the corresponding arm ring 33 or 36 so that downward pressure by the arming ring tends by a camming action to rotate the arming member in a direction to release the arming ring.

When the control lever 22 is in either its normal position shown in solid lines in Fig. 2 or is in the door-opening position represented by the recess 74 in Fig. 2, the arming lever 65 is at some ineffective position with respect to blocking of either of the arming members 35 and 37. For example, the arming lever may be at the solid line position in Fig. 8 or at some other ineffective position near thereto. When the control lever 22 is shifted to the first firing position represented by the recess 75 in Fig. 2, the arming lever 65 moves to the dotted position 58 of Fig. 8, at which position the arming lever blocks releasing rotation of both of the arming members 35 and 37. If a bomb is released accidentally or deliberately while the arming members 35 and 37 are free to rotate, the two springs 303 yield to permit releasing rotation of the arming members, thereby to release the arming rings 33 and 36 to cause the released bombs to be harmless. At the position 58 of the arming lever 65, however, the blocking of releasing rotation of the two arming members 35 and 37 will cause both of the arming rings 33 and 36 to be retained when a bomb is dropped. By virtue of this arrangement, energization of the solenoid 49 while the control lever 22 is in the first firing position causes a released bomb to be armed both for detonation on impact and detonation with delayed action.

When the control lever 22 is shifted to the second firing position represented by the recess 76 in Fig. 2, the arming lever 65 shifts to the dotted position 59 of Fig. 8 at which position the arming lever permits free rotation of the arming member 35 but blocks releasing rotation of the arming member 37. If at this time the solenoid 49 is energized by the electrical control system to release a bomb, the arming ring 33 will be released but the arming ring 37 will be retained to cause the bomb to be armed for delayed detonation only.

The control circuit, as fully described in my co-pending application, is such that it adapts itself automatically to the instant number and distribution of bombs carried by the aircraft. If any one of the shackles is omitted, the corresponding outside skip switch 61 at the shackle station automatically operates to cause the circuit to jump to the next station in the sequence. If a shackle is inadvertently mounted at a station without a bomb, the bomb-engagement mechanism of the shackle being in release position causes the corresponding skip switch 63 in the shackle to take its second position to cause current to be delivered to the next shackle station instead of to the solenoid in the shackle.

*Means to prevent inadvertent reversal of a shackle*

At the bottom of the bomb rack, one of the rails is cut away as indicated in Figs. 4 and 5 to provide a lateral entrance 309 to the previously mentioned channels 40 of the rail and to provide a suitable bevel 310 at the entrance. The other of the two rails is cut away to provide a suitable entrance 311 as shown in Fig. 6, there being a sharp edge 312 instead of a bevel at this second entrance.

The two entrances 309 and 311 permit the ground crew to introduce the two trunnions 41 of a shackle laterally into the guide channels 40. If the shackle is in proper position, the trunnion 41 having the protruding plunger 47 is moved into the entrance 309 and the other trunnion 41 which lacks any protruding means is moved into the entrance 311. When the shackle is manipulated in the described correct manner, the plunger 47 moves against the bevel 310, as shown in Figs. 4 and 5, and is moved inwardly by a cam action on the part of the bevel, there being no interference with the usual bombloading procedure. If, however, the shackle is reversed the protruding end of the plunger 47 encounters the sharp edge 312 as indicated in Fig. 6, which sharp edge will serve as my first stop means for calling attention of the ground crew member to the incorrect position of the shackle.

If the ground crew member inadvertently causes the protruding end of the plunger 47 to be retracted to permit the trunnion to pass the sharp edge 312, as indicated in the solid line position of the shackle in Fig. 6, continuation of the loading procedure will bring into effect the second stop means to call to the attention of the crew member the incorrect position of the shackle. The second stop means shown in Fig. 7 comprises a series of recesses 315 in the wall of the guide channel 40 in the path of the end of the plunger 47. Since the plunger 47 is continuously urged outwardly to the protruding position shown in Fig. 5, the plunger 47 enters one of the recesses 315 to encounter a stop shoulder 316 at the end of the recess. Engagement of the end of the plunger 47 with the stop shoulder 316 blocks further upward movement of the shackle through that particular guide channel 40, as indicated in Fig. 7, thereby causing the shackle and bomb to tip as warning to the ground crew. Fig. 7 shows the shackle and bomb in tipped position. Preferably, instead of using the usual sling to lift a bomb in the described loading procedure, I employ the loading method disclosed in my copending application, Serial No. 458,605, filed September 16, 1942, which has matured into Patent No. 2,436,405, granted February 24, 1948, entitled "Means for engaging and hoisting bombs and other objects." In such preferred procedure, the bomb is lifted by a clamp in engagement with the shackle, the clamp permitting the bomb to tilt more readily than the usual sling.

For cooperation with the novel clamp that is generally designated 319 in Figure 12, the casing of each shackle S is formed to provide a cylindrical grip-portion 320 shown in side elevation in Figure 12 and in cross-section in Figure 13. As indicated clearly in Figure 12, this grip-porton 320 is not centered with respect to the two engagement recesses 231. When such a shackle is correctly engaged with a bomb, the grip-portion 320 of the shackle is directly over the center of gravity of the bomb so that there is no marked tendency for the bomb to tilt or pitch when lifted by the clamp 319. On the other hand, since the grip-portion 320 is not centralized with respect to the engagement recesses 231, inadvertent reversal of the shackle relative to the bomb displaces the grip-portion 320 by a substantial distance from the center of gravity of the bomb to cause the bomb to tilt strongly when lifted by the clamp. It is apparent, then, that in the preferred practice of my invention the shackle construction inherently provides for warning the loading crew when the shackle is reversed in its engagement with a bomb.

My disclosure in specific detail of the preferred form of the invention will suggest to those skilled in the art various substitutions and changes that do not depart from my basic concept, and I reserve the right to all such variations that lie within the scope of my appended claims.

I claim as my invention:

1. An aircraft apparatus for aerial bombs, comprising: a bomb rack providing a pair of track members; a shackle for releasable engagement with a bomb, said shackle having a pair of guide members for slidable engagement with said track members respectively; yielding means on a member of one of said pairs of members to block movement of said shackle into engagement with said bomb rack when the shackle is reversed with respect to the bomb rack; and means to control said yielding means for passage of said shackle in correct position to engage the bomb rack.

2. An aircraft apparatus for aerial bombs, comprising: a bomb rack providing a pair of track members; a shackle for releasable engagement with a bomb, said shackle having a pair of guide members for engagement with said track members respectively; yielding means on a member of one of said pairs of members to block movement of said shackle into engagement with said bomb rack when the shackle is reversed with respect to the bomb rack; and means on a member of the other of said pairs of members to retract said yielding means automatically when the shackle in correct position is moved into engagement with the bomb rack.

3. An aircraft apparatus for aerial bombs, comprising: a bomb rack providing a pair of track members; a shackle for releasable engagement with a bomb, said shackle having a pair of guide members for engagement with said track members respectively; stop means yieldingly extending from a member of one of said pairs of members cooperative with a member of the other of said pairs of members when the shackle is reversed in position with respect to the bomb rack to block mounting movement of the shackle relative to the bomb rack at a first position; additional stop means operable during said reversal in position for blocking mounting movement of said shackle at a subsquent second position in the event the reversed shackle moves past said first position; and means to render said stop means inoperative when the shackle is moved in correct position to engage the bomb rack.

4. An aircraft apparatus for aerial bombs, comprising: a bomb rack providing right and left upwardly extending tracks; a shackle for releasable engagement with a bomb, said shackle having right and left engagement means for movably engaging with said tracks; means yieldingly extending from one of said engagement means to block movement of the engagement means into engagement with one of said tracks when the shackle is reversed relative to the bomb rack; and means at the entrance end of the other of said tracks to retract said yieldingly extending means automatically when the shackle is correctly applied to the bomb rack.

5. An aircraft apparatus for aerial bombs, comprising: a bomb rack providing right and left upwardly extending tracks; a shackle for releasable engagement with a bomb, said shackle having right and left engagement means for movably engaging with said tracks; means yieldingly extending from one of said engagement means to block movement of the engagement means at the entrance end of one of said tracks when the shackle is inadvertently reversed with respect to the bomb rack; at least one stop shoulder associated with said one of the tracks to block movement of said one of the engagement means if said yielding means is inadvertently retracted to permit engagement of said one of the engagement means with said one of the tracks; and means at the entrance end of the other of said tracks to retract said yieldingly extending means automatically when the shackle is correctly applied to the bomb rack.

6. An aircraft apparatus for aerial bombs, comprising: a bomb rack providing a pair of tracks; a shackle for movably engaging with said tracks; mechanism carried by said shackle for releasable engagement with a bomb, said mechanism including an operating member; yielding means to urge said operating member toward a position extending from the shackle; control mechanism on the bomb rack to engage said operating member when the shackle is correctly mounted on the bomb rack; and means on the bomb rack to block said extended operating member when the shackle is applied to the bomb rack while reversed with respect to said pair of tracks.

7. Bombing armament for aircraft, comprising in combination: means to support an aerial bomb having a quick-acting fuse and a delayed action fuse; means to release said bomb; arming means on said support for said quick-acting fuse; arming means on said support for said delayed action fuse; means to control said arming means; and a second control means, said second control means being movable on said support to a series of positions to actuate said bomb release means, and also to actuate said arming control means to arm both of said fuses when said second means is in one position, to arm only one of said fuses when in another position and to arm neither of said fuses when in still another position.

8. Bombing armament for an aircraft, including in combination: means to releasably support an aerial bomb; means to release said supporting means whereby to drop said bomb; means normally effective to engage both a first relatively movable, quick detonation, arming means, and a second relatively movable, delayed detonation, arming means in said bomb, in a manner to permit release of both said arming means automatically upon accidental or emergency release of said bomb; and control means actuable by said release means and effective to cause said engagement means to engage said two arming means selectively in a positive manner.

9. Bombing armament for an aircraft, including in combination: means to releasably support an aerial bomb; means to release said supporting means whereby to drop said bomb; a first engagement means on the aircraft to normally yieldingly retain a first relatively movable, quick detonation, arming means in said bomb; a second engagement means on the aircraft to normally yieldingly retain a second relatively movable, delayed detonation, arming means in said bomb; and control means actuable by said release means to block releasing movement of said two engagement means simultaneously, or one of said means selectively.

10. Bombing armament for an aircraft, including in combination: means to releasably support an aerial bomb; means to release said supporting means whereby to drop said bomb; a first engagement means on the aircraft to engage a first relatively movable, quick detonation, arming means in said bomb; a second engagement means on the aircraft to engage a second relatively movable, delayed detonation, arming means in said bomb; yielding means to hold both said engagement means in an engaging position, said two engagement means being adapted to open in opposition to said yielding means in response to release of the bomb accidentally or in an emergency; and control means actuable by said release means to block releasing movement of said two arming means selectively.

11. Bombing armament for an aircraft, including in combination: means to releasably support an aerial bomb; means to release said support means whereby to drop said bomb; a first engagement means on the aircraft to engage a first relatively movable, quick detonation, arming means in said bomb; a second engagement means on the aircraft to engage a second relatively movable, delayed detonation, arming means in said bomb; yielding means to hold both said engagement means in engaging position, said two engagement means being adapted to open in opposition to said yielding means in response to release of the bomb accidentally or in an emergency; and control means actuable by said release means movable to one firing position to release movement of both said arming means and movable to a second firing position to block releasing means of said second arming means only.

12. Bomb supporting apparatus for an aircraft, comprising in combination: a bomb rack in the aircraft; and a shackle adapted for releasable engagement with an aerial bomb having support elements at positions non-symmetrical with respect to the center of gravity of the bomb, said shackle being adapted for engagement with said bomb rack to support the bomb, and having a single grip portion for engagement by hoist means for lifting the bomb into the aircraft, said grip portion being off-center with respect to the shackle by an amount to place the grip portion over the center of gravity of the bomb when the bomb is correctly engaged by the shackle, whereby said grip portion is substantially displaced laterally from said center of gravity to cause the bomb to tilt strongly when the shackle is reversed in its engagement with the bomb, and then the shackle and bomb are lifted by said grip portion.

CLAUDE C. SLATE.

REFERENCES CITED

The following references are of record in the file of this patent:

UNITED STATES PATENTS

| Number | Name | Date |
|---|---|---|
| 1,396,150 | Weed | Nov. 8, 1921 |
| 1,893,232 | Halsey | Jan. 3, 1933 |
| 1,980,375 | Bradshaw | Nov. 13, 1934 |
| 2,341,457 | Markey | Feb. 8, 1944 |

FOREIGN PATENTS

| Number | Country | Date |
|---|---|---|
| 328,662 | Great Britain | May 5, 1930 |
| 406,477 | Great Britain | Mar. 1, 1934 |
| 490,028 | Great Britain | Feb. 1, 1938 |
| 666,812 | France | May 28, 1929 |
| 678,918 | France | Jan. 2, 1930 |